(12) United States Patent
McBain

(10) Patent No.: US 6,720,076 B2
(45) Date of Patent: Apr. 13, 2004

(54) IN-MOLD PRIMER COATING FOR THERMOPLASTIC SUBSTRATES

(75) Inventor: Douglas S. McBain, Wadsworth, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 112 days.

(21) Appl. No.: 10/160,576

(22) Filed: May 31, 2002

(65) Prior Publication Data

US 2003/0224172 A1 Dec. 4, 2003

(51) Int. Cl.⁷ ................................................ B32B 27/36
(52) U.S. Cl. ........................ 428/412; 428/412; 428/423; 428/451; 528/196
(58) Field of Search ................................ 428/412, 423, 428/451; 528/196

(56) References Cited

U.S. PATENT DOCUMENTS

| | | |
|---|---|---|
| 4,414,173 A | 11/1983 | Cobbledick et al. |
| 4,508,785 A | 4/1985 | Cobbledick et al. |
| 4,515,710 A | 5/1985 | Cobbledick et al. |
| 4,534,888 A | 8/1985 | Cobbledick et al. |
| 4,668,460 A | 5/1987 | Onega |
| 5,084,353 A | 1/1992 | Cobbledick et al. |
| 5,132,052 A | 7/1992 | Cobbledick et al. |
| 5,359,002 A | 10/1994 | Cobbledick et al. |
| 5,391,399 A | 2/1995 | Cobbledick et al. |
| 5,614,581 A | 3/1997 | Cobbledick et al. |
| 5,902,534 A | 5/1999 | Fujishiro et al. |

*Primary Examiner*—Terressa Boykin
(74) *Attorney, Agent, or Firm*—Fay, Sharpe, Minnich, & Mckee LLP; David G. Burleson

(57) ABSTRACT

An in-mold primer coating adapted to be applied in-mold to a thermoplastic substrate and heat cured to form a thermoset surface coating on the molded substrate. The in-mold primer coating comprises a coreactive polymerizable composition comprising an epoxy-acrylate oligomer having a molecular weight from about 350 to about 2500, a hydroxyl functional acrylate or methacrylate, a vinyl aromatic monomer such as styrene, and a small amount of acrylic or methacrylic acid, with the balance being other diacrylate and/or other ethylenically unsaturated monomer(s), if any.

33 Claims, 2 Drawing Sheets

IN-MOLD PRIMER COATING FOR THERMOPLASTIC SUBSTRATES

FIELD OF THE INVENTION

The invention pertains to in-mold coatings for thermoplastic substrates and more particularly to reactive epoxy-acrylates copolymerizable with other ethylenically unsaturated components to provide a thermosetting in-mold primer coating for thermoplastic substrates including polycarbonates and polycarbonate alloy substrates.

BACKGROUND OF THE INVENTION

Thermoplastic substrates ordinarily are based on converting thermoplastic resins, powders, granules, pellets and similar forms of thermoplastic resinous material under heat and pressure to form useful molded articles. Injection molding processes for molding thermoplastic resinous materials typically comprise heating the molding compound to form a viscous flowable melt, injecting the heated melt under high pressure into a relatively cool closed mold cavity, cooling the melt to form a solid shape molded substrate conforming to the interior configuration of the mold cavity, and then ejecting the molded part from the mold cavity. Thermoplastic compression molding ordinarily comprises thermoplastic resin compounded with fillers, colorants, lubricant and other processing additives to form granular or palletized thermoplastic particles known as molding powder. On the application of heat and pressure, the compounded molding resin flows under pressure into a heated mold to conform to the shape of the mold cavity. The mold is closed and the heat and pressure is maintained for sufficient dwell time to fully form the intended plastic article. The mold and formed plastic article are cooled to harden the molded plastic article, whereupon the mold can be opened and the molded article removed. In thermoplastic molding processes, the molded part can be a finished article having many design details such as bosses, flanges, ribs, bushings, holes or other openings, various functional structures, decorative designs, and flat surfaces. Most molded substrates need to be painted and need to obtain good adhesion to the applied surface coating. However, many desirable decorative or other finish surface coatings are difficult to adhere directly to thermoplastic substrates, especially polycarbonates and polycarbonate alloy plastics. Paint adhesion to molded thermoplastic substrates is frequently difficult to obtain with an applied finished top surface coating and invariably requires an intermediate primer coating to achieve the necessary adhesion with the particular thermoplastic substrate. The primer coating must provide adhesion to the substrate as well as interface adhesion with the finished surface coatings. Thus, for various reasons, an in-mold primer coating is often used in injection molding of thermoplastics to enable subsequent adhesion of a wide variety of surface top coatings regardless of the substrate thermoplastic resin composition. It is particularly difficult to obtain adhesion with surface coatings on thermoplastic polycarbonates and polycarbonate plastic alloys.

In-mold coatings typically are sprayed into the mold cavity to coat the interior mold surfaces during the molding process to provide a primer surface coating integrally fused or adhered to the thermoplastic substrate being molded. In-mold coatings have been found to be particularly advantageous for molded parts or articles to provide a functional surface coating similar to post-mold process such as paint, as well as avoid surface imperfections in the molded part such as surface porosity, sink marks, surface waviness, and similar surface defects and imperfections which frequently require additional labor and costs to rework and post finish such moldings. In addition, in-mold primer coatings must provide adhesion to the substrate along with interface adhesion with most any type of finish surface coating. In-mold coatings can be injected into a slightly opened mold, or under pressure into a closed mold, where the in-mold coating is applied to the mold cavity surfaces and/or applied over a molded or partially molded substrate, and then cured under heat and pressure in the mold cavity to form an integral thermoset cured surface coating on the molded substrate. An in-mold coating can be injected into the mold after the mold pressure is released or while the mold is opened infinitesimally to permit injection of the in-mold coating into the mold cavity. For instance, U.S. Pat. No. 5,902,534 discloses a method of injecting molding resin into a mold, followed by injecting an in-mold coating into the mold cavity between the molded substrate and the mold cavity surfaces, then compressing and curing the in-mold coating while in contact with the mold cavity surface, and then cooling the molded substrate to provide interface adherence of the cured in-mold coating to the molded substrate surface. Similarly, U.S. Pat. No. 4,668,460 suggests a method of in-mold coating a molded substrate contained within a closed mold by first molding the substrate under pressure and then injecting an in-mold coating into the closed mold at a pressure higher than the molding pressure. In-mold coatings are primarily directed to producing smooth surfaces free of surface defects and imperfections, while in-mold primer coatings additionally provide good adhesion to the specific thermoplastic substrate and an adherent surface for the subsequently applied surface topcoat.

In-mold polymeric epoxy acrylate coatings containing copolymerizable epoxy acrylates and/or ethylenically unsaturated monomers are disclosed in U.S. Pat. No. 4,414,173, U.S. Pat. No. 4,508,785, U.S. Pat. No. 4,515,710, U.S. Pat. No. 4,534,888, U.S. Pat. No. 5,084,353, U.S. Pat. No. 5,359,002, U.S. Pat. No. 5,391,399, U.S. Pat. No. 5,614,581, and U.S. Pat. No. 5,132,052.

It now has been found that an in-mold primer coating comprising an epoxy-acrylate copolymer adapted to addition copolymerize with other ethylenically unsaturated components, including particularly minor amounts of a copolymerizable acrylic acid selected from acylic, methacrylic or ethacrylic acids, provides an excellent in-mold primer coating for difficult adhesion substrates, such as thermoplastic polycarbonates and polycarbonate based alloy molding compounds. The in-mold primer coating of this invention further provides excellent interface adhesion with most surface finishes and/or decorative top coatings. The cured in-mold primer coating produces smooth primer surfaces free of surface defects and imperfections, which enables direct finish coat painting without intervening costly refinishing or reworking of the molded part. These and other advantages of this invention will become more apparent by referring to the detailed description of the invention and the illustrative examples herein.

SUMMARY OF THE INVENTION

Briefly, the invention pertains to thermosetting in-mold primer coatings for injection and compression molded thermoplastic substrates, especially polycarbonates and polycarbonate plastic alloys, to provide molded thermoplastic parts or articles with a cured in-mold primer coating integrally fused with the surface of the thermoplastic molded substrate. The in-mold primer coating of this invention comprises on a weight percentage basis from about 25% to about 65% or about 74% or about 75% of a low molecular weight epoxy acrylate oligomer having terminal acrylate or methacrylate groups and a number average molecular weight from about 360 to about 2,500, from about 15% to about 40% of an hydroxyl alkyl acrylate or methacrylate, from about 10% to about 35% vinyl substituted aromatic hydrocarbon monomers and from about 1% to about 10% of an acrylic acid.

On a weight parts basis, the in-mold primer coating comprises 100 weight parts of the epoxy-acrylate oligomer, from about 30 to about 70 weight parts of an hydroxyl alkyl acrylate or methacrylate, from about 30 to about 80 weight parts of a vinyl aromatic monomer, and from about 2 to about 20 weight parts of an acrylic acid monomer, where the basis is 100 weight parts of the epoxy-acrylate oligomer. The in-mold primer coating is injected into the mold cavity after the thermoplastic substrate molding composition is at least partially set to form a molded substrate. The injected in-mold primer coating is cured under heat and pressure to become an integrally fused primer surface coating adhered to the molded thermoplastic substrate surface.

DETAILED DESCRIPTION OF THE INVENTION

The in-mold primer coating composition of this invention is based on a thermosetting copolymerizable composition comprising an epoxy acrylate oligomer, an hydroxy alkyl acrylate, a vinyl aromatic monomer, and an acrylic acid, to provide a curable in-mold primer coating for use on injection and compression molded thermoplastic substrates.

Referring first to the epoxy acrylate oligomer, the epoxy acrylate comprises an epoxy derived intermediate reacted with an acrylic acid such as acrylic acid, methacrylic acid, or ethacrylic acid to produce an acrylate terminated epoxy acrylate having at least two terminal acrylate groups. The epoxy intermediate can be an aromatic epoxy derived from bisphenol-A or a phenolic novalak epoxy, or an epoxy derived from alkylene oxide resins or other diglycidyl functional resin. Bisphenol epoxy intermediates are preferred predominantly comprising the coreaction product of polynuclear dihydroxy phenols or bisphenols with halohydrins to produce epoxy resin intermediates containing at least one, predominantly two, and preferably two terminal epoxy functional groups per epoxy molecule. The most common bisphenols are bisphenol-A, bisphenol-F, bisphenol-S and 4,4'-dihydroxy bisphenol-A. Useful halohydrins include epichlorohydrin, dichlorhydrin, and 1,2-dichlorohydrin-3-hydropropane, with the preferred being epichlorohydrin. A preferred epoxy resin intermediate, for example, comprises the reaction of excess equivalents of epichlorohydrin with lesser equivalents of a bisphenol-A to produce an epoxide group terminated linear chain comprising repeating units of diglycidyl ether of bisphenol-A. Ordinarily excess equivalents of epichlorohydrin are reacted with bisphenol-A where up to two molar equivalents of epichlorohydrin coreact with one molar equivalent of bisphenol-A to produce the diepoxide, although less than complete reaction is possible where some monoepoxide chains may be terminated at the other end with a bisphenol-A unit. Less preferred epoxy resins are predominantly bisphenol-A terminated and esterified with an acrylic acid to produce the epoxy-acrylate oligomer. The most preferred epoxy intermediates are polyglycidyl ethers of bisphenol-A having two terminal 1,2-epoxide groups. Less preferred epoxy intermediate resins comprise epoxide terminated epoxy novalac resins produced similar to bisphenol epichlorohydrin epoxies described above.

The epoxy terminated intermediate, preferably a diepoxide, is further reacted with excess equivalents of an acrylic acid to provide an acrylate terminated epoxy having acrylate double bonds essentially terminating each terminal end of the epoxy intermediate. The preferred epoxy acrylate is an epoxy diacrylate. Acrylic acids comprise acrylic acid (preferred) or a low alkyl, e.g., 1 to about 3 carbon atoms, substituted acrylic acid such as methacrylic acid or ethacrylic acid. Useful molecular weights of epoxy acrylates are number average molecular weights from about 360 to about 2,500, and preferably from about 1,000 to about 2,000, as measured by GPC.

Epoxy acrylates are mixed with copolymerizable hydroxy alkyl acrylates in accordance with this invention. Useful hydroxy alkyl acrylates comprise alkyl acrylates and methacrylates where the alkyl group contains from 1 to about 10, and preferably from 1 to about 5, carbon atoms. Useful alkyl groups include for instance methyl, ethyl, propyl, butyl, and higher alkyl groups where propyl is the preferred alkyl chain and hydroxyl propyl acrylate is the preferred hydroxy acrylate. Hydroxy alkyl acrylates and/or methacrylates comprise from about 30 to about 70 parts by weight, and preferably from about 40 to about 60 parts by weight per 100 parts by weight of the epoxy-acrylic oligomer. One or more hydroxy alkyl acrylates can be utilized in the in-mold coating.

A further copolymerizable component of the thermosetting in-mold primer coating composition of this invention comprises a vinyl substituted aromatic hydrocarbon monomer including for example styrene, lower alky, e.g., 1 to about 5 carbon atoms, substituted styrenes such as alpha methyl and ethyl styrenes, vinyl toluene, halo substituted styrenes such as alpha-chloro styrene, and similar monovinyl aromatic monomers. On a weight basis, the copolymerizable in-mold primer coating composition of this invention contains from about 30 to about 80 parts by weight, and preferably from about 40 to 70 parts by weight vinyl aromatic monomer per 100 parts by weight of the epoxy-acrylic oligomer.

In accordance with this invention, a minor amount of an acrylic acid monomer selected from acrylic acid, methacrylic acid, ethacrylic acid, or mixtures thereof, is included in the copolymerizable in-mold primer coating mixture. The inclusion of an acrylic acid component has been found to be particularly effective in providing adhesion to particularly difficult adherent thermoplastic substrates such as thermoplastic polycarbonate and polycarbonate based thermoplastic alloys. The preferred acrylic acid is methacrylic acid. On a weight basis, the copolymerizable in-mold primer coating composition comprises from about 2 to about 20 parts by weight, and preferably from about 5 to about 15 parts by weight per 100 parts by weight of the epoxy-acrylic oligomer.

The in-mold primer coating of this invention can contain minor amounts of copolymerizable other mono-ethylenically unsaturated alkyl or alicyclic monomer having a carbon to carbon double bond unsaturation including vinyl monomers, allylic monomers, acrylamide monomers, and similar mono-ethylenically unsaturated alkyl or alicyclic monomers. Useful vinyl monomers include vinyl esters such as vinyl acetate, vinyl propionate, vinyl propionate, vinyl butyrates, vinyl isopropyl acetates and similar vinyl alkyl esters, and vinyl alicyclic monomers such as cyclohexane. Useful acrylamide monomers include, for instance, methyl, ethyl, propyl, butyl, 2-ethyl hexyl, cylocohexyl, decyl, isodecyl, benzyl and similar lower alkyl acrylamide or methacrylamide monomers. N-alkoxymethyl derivatives can also be used such as, for example, N-methylol, N-ethanol acrylamides or methacrylamides. On a weight basis, the in-mold coating can contain from 0 to about 20 weight parts of other mono-ethylenically unsaturated alkyl or acylic copolymerizable monomer based on 100 weight parts of copolymerizable epoxy acrylate oligomer in the in-mold primer coating composition.

The in-mold primer coating composition can contain, if desired, a minor amount of an additional low molecular weight diacrylate such as acrylic or methacrylic diester of a diol. The in-mold primer coating can contain, if any, from about 0.1 or about 1 to about 10 weight parts of such other low molecular weight diacrylate, if desired.

On a weight parts basis, the in-mold primer coating of this invention comprises 100 weight parts of epoxy-acrylate oligomer, from about 30 to about 70 weight parts and preferably from about 40 to about 60 weight parts, of an hydroxyl functional acrylate or methacrylate, from about 30 to about 80 weight parts, and preferably from about 40 to about 70 weight parts, of a vinyl aromatic monomer, from about 2 to about 20, and preferably from about 5 to 15 weight parts, of an acrylic acid selected from acrylic, methacrylic, and/or ethacrylic acid, with the balance if any being minor amounts of 1 to about 20 weight parts of other mono-ethylenically unsaturated monomer(s) and/or low molecular weight other diacrylate, where weight parts are based on 100 weight parts of the epoxy-acrylic oligomer.

The in-mold primer coating of this invention comprising epoxy acrylate, hydroxyl alkyl acrylate, vinyl aromatic monomer, and an acrylic acid component is copolymerized and thermoset under heat in the presence of a free radical initiator such as peroxide. Useful peroxides include t-butyl peroxide, t-butyl perbenzoate, t-butyl peroctate, dibenzoyl peroxide, methyl ethyl ketone peroxide, diacetyl peroxide, t-butyl hydroperoxide, ditertiary butyl peroxide, benzoyl peroxide, t-butyl peroxypivalate, 2,4-dichlorobenzoyl peroxide, decanoylperoxide, propionyl peroxide, hydroxy-heptyl peroxide, cyclohexanone peroxide, dicumyl peroxide, cume hydroperoxide, and similar free radical peroxide initiators. Azo free radical initiators can be useful including for instance azo bis-isobutyronitrile, dimethyl azobis-isobutyrate, and similar azo free radical initiators. A preferred initiator is t-butyl perbenzoate. Free radical peroxide or azo initiators are added to the copolymerizable in-mold primer coating at a level above about 0.5%, desirably from about 1 to about 5%, and preferably from about 1% to about 2%, by weight based on the weight of the copolymerizable thermosetting components of the in-mold primer coating composition comprising epoxy acrylate oligomer, hydroxy alkyl acrylate, aromatic monomer, acrylic acid monomer and other polymerizable components if any.

In conjunction with the free radical initiator, an accelerator can be added, if desired to accelerate curing, including cobalt driers such as cobalt napthenate or octoate, or other metal napthenates such as zinc, lead, and manganese napthenates, or mixtures of such accelerators. Ordinarily minimal amounts of accelerator are used, if desired, at levels from about 0.01% to about 1%, preferably from about 0.01% to about 0.5%, based on the weight of the copolymerizable thermosetting components in the in-mold primer coating composition. Conversely, inhibiters can be added to control and delay cure times, if desired, such as benzoquinone, hydroquinone, and methoxyhydroquinone. Inhibiters if used are added at very low levels, typically below 0.1% to delay and properly control the copolymerization rate of the in-mold primer coating.

The in-mold copolymerizable thermosetting primer coating composition can be compounded with other additives, known to the art and to the literature, such as opacifying pigments, tinting pigments or colorants, and inert fillers. Useful opacifying pigments include titanium dioxide, zinc oxide, titanium calcium, while tinting pigments include a variety of oxides, chromium, cadmium, and other tinters. Carbon black ordinarily will be used predominantly in the in-mold primer coating of this invention to provide a black or gray primer coating appearance. Useful fillers include clays, silicas, talc, mica, wood flower, barium sulfate, calcium and magnesium silicates, aluminum hydroxide, barium sulfate, and magnesium and calcium carbonates, where preferred fillers are talc and barium sulfate. Opacifying pigments, tinting pigments or colorants, and inert fillers can be used at a level from about 0 to about 80 weight parts per 100 weight parts of copolymerizable in-mold coating composition.

Other additives to the in-mold primer coating can include lubricants and mold release agents such as zinc or calcium stearate, phosphoric acid esters, and zinc salts of fatty acids. Mold release agents can also be used to control the cure rate, where zinc fatty acids tend to moderately accelerate the cure time, while calcium fatty acids tend to moderately retard the cure time. A low profile additive, such as polyvinyl acetate, can be added if desired to avoid molding shrinkage of the in-mold primer coating.

The thermosetting in-mold primer coating composition of this invention can be prepared by mixing together the epoxy acrylate, hydroxy alkyl acrylate, vinyl aromatic monomer, and acrylic acid component to form a uniform fluid resinous blend. The free radical initiator can be added to the resinous mixture, or added with one on the resinous components such as the aromatic monomer, along with accelerator if any, and inhibiter if any. Other compounding ingredients of pigments, colorants and fillers and other additives can be added as desired and mixed to form a uniformly dispersed in-mold primer coating composition.

Referring now to particularly useful thermoplastic substrates, the thermosetting in-mold primer coating compositions of this invention are particularly suitable for obtaining good adhesion over a thermoplastic polycarbonate based substrate, such as polycarbonate and polycarbonate plastic alloys. Thermoplastic polycarbonates are primarily aromatic polyesters derived from reaction of carbonic acid derivatives with primarily an aromatic diol. For example, polycarbonates can be formed by phosgene reaction with a diol such as bisphenol-A, or by a melt transesterification between bisphenol-A and a carbonate ester such as diphenyl carbonate. Poly(bisphenol-A carbonate) is a condensation polymer ordinarily synthesized from bisphenol-A and phosgene in the presence of monophenol chain terminator to control molecular weight. The most common polycarbonate is bisphenol-A based produced by interfacial reaction of bisphenol-A with carbonyl chloride where molecular weight can be controlled by a phenolic chain stopper. Useful number average molecular weights of aromatic thermoplastic polycarbonates ordinarily are from about 10,000 to about 50,000, where from about 22,000 to about 35,000 molecular weights are preferred.

Polycarbonate polymeric blends or alloys with other thermoplastic polymers are likewise useful thermoplastic substrates on which the thermosetting in-mold primer coating of this invention achieves good substrate adhesion. Useful polycarbonate alloy blends include aromatic polycarbonate mixed with poly(butylenes terephthalate) known as PC/PBT, and aromatic polycarbonate blended with poly(ethylene terephthalate) known as PC/PET, as well as other polymeric alloy blends with aromatic polycarbonate. Such polycarbonate alloys ordinarily comprise a mixture of polycarbonate containing from about 40 to about 95 weight percent aromatic polycarbonate with the balance being the alloying secondary thermoplastic polymer or polymers. Additives to polycarbonates and alloy blends thereof can include tinting pigments, colorants, heat stabilizers, impact modifiers, lubricants, mold release agents, UV stabilizers, plasticizers, fibers, reinforcing materials, fillers, and other additives ordinarily added to injection molding thermoplastic substrate compounding resins as desired.

The thermosetting in-mold primer coating of this invention is particularly useful as an in-mold coating for molding of polycarbonate alloys comprising major amounts of polycarbonate mixed with minor amounts of Nylon, ABS, PET, PBT, and/or HIPS. The Polycarbonate and alloying co-polymer can be heated to make the two polymeric material miscible or partially miscible depending on the alloying polymer. The polymers may or may not interact, such as by ester interchange, during the heat alloying process. The polycarbonate ordinarily is the dominant matrix polymer but need not be. On a weight basis, polycarbonate alloys comprise by weight from about 40 to about 95% polycarbonate, preferably from about 50 to about 80% polycarbonate, with the balance being blend or alloying polymer or polymers.

Nylons are polyamides having repeating amide groups ordinarily produced by condensation polymerization of a dibasic acid with a diamine or addition polymerization of a ring monomer compound having both carboxylic acid and amine groups on the same monomer. For example, adipic acid or similar 6 to 12 carbon dibasic acid, or longer aliphatic chain, can be condensation polymerized with hexamethylene diamine adipamide, while e-caprolactam can be homopolymeized to form polycaproamide. Nylon can be alloyed with polycarbonate and compounded with fillers and additives in much the same manner as polycarbonates.

ABS is a polymeric material comprising copolymerization of acylonitrile, butadiene, and styrene in various ratios to form a terpolymer comprising butadiene rubber grafted with styrene-acrylonitrile and provide a thermoplastic exhibiting various physical and strength properties, as desired. Acylonitrile contributes stability, chemical resistance, and aging resistance, while butadiene provides low temperature property retention, toughness, and impact strength, and styrene provides rigidity. Ordinarily ABS comprises from about 5 to about 30% by weight butadiene rubber with the balance being styrene-acrylonitrile copolymer. A fourth monomer can be copolymerized if desired to provide special properties, such as alpha-methyl styrene for high heat deflection. ABS can be alloyed with polycarbonate to form a polycarbonate alloy which can be compounded with pigments, filler and other additives in much the same manner as polycarbonates to form a thermoplastic molding composition for injection molding of thermoplastic substrates. The thermosetting in-mold primer coating of this invention can be applied to the molded ABS modified polycarbonate substrate by in-mold injection of the primer coating in accordance with this invention.

Polyethylene terephthalate is known as PET. PET is a polycondensation polymerized polymer of ethylene glycol and terephthalic acid, or ethylene glycol transesterified with dimethyl terephthalate, to produce PET. Ordinarily ethylene glycol is esterified or transesterified using a continuous melt phase condensation polymerization process, or transesterification process, and can be followed by solid-state polymerization at higher temperatures to obtain higher molecular weight PET, if desired. PET can be alloyed with polycarbonate and compounded with other compounding ingredients to provide a thermoplastic injection molding compound useful as an injection molded substrate capable of achieving good surface adhesion with the in-mold primer coating in accordance with this invention.

Polybutylene terephthalate is commonly known as PBT. Polybutylene terephthalate or polytetramethylene terephthalate is made by direct esterification of 1,4-butanediol with dimethyl terephthalate in much the same manner as PET. The PBT thermoplastic can be alloyed with polycarbonate and compounded with filler, pigments, and other additives similar to polycarbonate compounding.

High impact styrene is commonly known as HIPS. High impact styrene is polystyrene reinforced with a rubber compound comprising a non-crystalline polystyrene thermoplastic toughened by incorporating a rubber additive without diminishing other properties. The rubber additive component comprises a large number of small gel particles with a modulus much lower than the matrix polystyrene. The rubber gel particles are added to avoid brittle fracture by absorbing impact energy through micro-craze formation at the gel particles, while preventing craze propagation cracks, to provide a thermoplastic substrate that does not bend or crack under stress due to high flexural modulus. The rubber gel particles ordinarily comprise polybutadiene and typically are about 1 to 2 millimicrons in size. HIPS thermoplastic resins can be alloyed with polycarbonate and compounded with other additives and compounding components in much the same manner as polycarbonates to provide an injection molded substrate. The alloy of polycarbonate with HIPS provides an injection molded substrate having good adhesion with the in-mold primer coating of this invention.

The in-mold primer coating of this invention is similarly useful on other thermoplastic substrates in addition to polycarbonate and polycarbonate alloyed thermoplastic. Useful other thermoplastic substrates include PET, PBT and copolymers, nylon, ABS, HIPS, and thermoplastic polyurethanes.

Injection molding involves heating the resinous compounding composition to a temperature above the melting point of the compounding resin and injecting the heated resin melt into an injection mold cavity for molding a substrate part or article. The substrate resinous molding compound ordinarily is injected into the cavity of an injection mold and molded under heat and pressure to at least partially set the thermoplastic molding resin and form a molded substrate. Substrate molding temperatures typically are from about 100 to about 300° F. and preferably from about 150 to about 250° F. During the molding and cooling stage, the injection molding pressure preferably is partially released from the mold to permit injection of the in-mold appearance coating of this invention into the minimally opened mold under reduced low pressure. Alternatively, the substrate molding compound can be injection molded under high pressure followed by injecting the in-mold coating at a higher pressure into the mold maintained closed under pressure A metered amount of the in-mold coating containing initiator, additives, and other compounding ingredients as desired is injected into a nozzle located within the parting line of the mold cavity and preferably disposed opposite from the thermoplastic substrate injection sprues. Pressure can be applied as needed and ordinarily can be from about 2,000 to about 5,000 psi, and preferably from about 3,000 to about 4,000 psi, but ordinarily at a pressure considerably less than the pressure applied while molding the substrate resinous compound. The applied pressure can increase as the in-mold appearance coating is injected between the partially molded substrate and the mold cavity surfaces. The in-mold coating is heat cured to conduct copolymerize the epoxy acrylate oligomer, hydroxy alkyl acrylate, the vinyl aromatic monomer, and the acrylic acid monomer to form a fully cured in-mold primer surface coating advantageously molded integrally with and fusion adhered to the fully formed thermoplastic substrate. In-mold coating curing temperatures can be from about 150 to about 300° F. for time sufficient to fully cure the in-mold coating. The heat curing intervals typically are from about 30 to about 120 seconds and preferably from about 60 to about 90 seconds. The mold is then opened and the surface coated molded part or article can be removed from the mold cavity. The cured surface coating provides excellent adhesion to the polycarbonate based substrate as well as an excellent primer surface amenable to good adhesion with a wide variety of top surface finish coatings.

In a preferred aspect of this invention, the in-mold primer coating can be used in an in-mold coating process for an injection molding process and apparatus described in the drawings. In the drawings.

Figure 1:
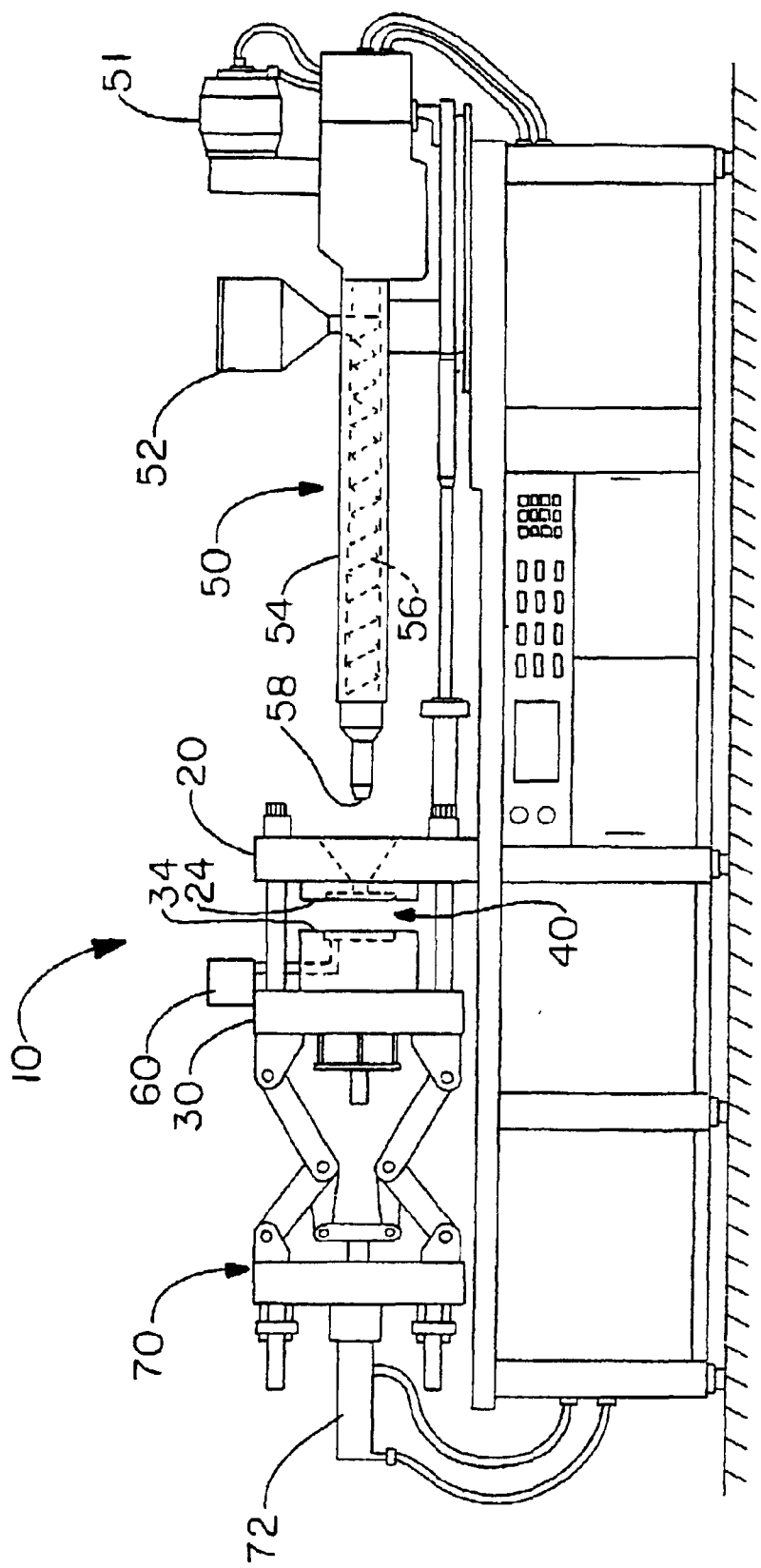
FIG. 1 is a side view of a molding apparatus suitable for practicing the method of the present invention.
Figure 3:
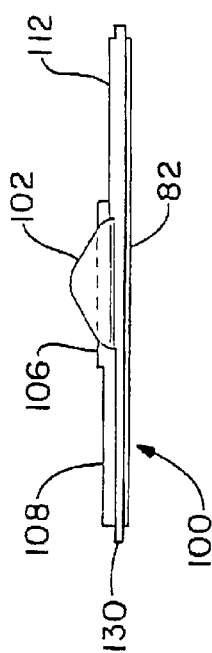
FIG. 3 is a top view of a molded substrate prior to being coated with an in-mold coating. The substrate is shown having an area of increased thickness in order to promote and/or channel in-mold coating flow.

Referring now to the drawings wherein like reference numerals indicate like or corresponding parts throughout the several figures, the in-mold coating process is described in conjunction with a molding apparatus generally designated 10 in FIG. 1. Molding apparatus 10 includes a first mold half 20 which preferably remains in a stationary or fixed position relative to a second moveable mold half 30. FIG. 1 shows the mold halves in an open position. The first mold half and second mold half are adapted to slidingly mate, or nest, thereby forming a mold cavity 40 therebetween as shown in at least FIG. 2. The mold halves mate along surfaces 24 and 34 (FIG. 1) when the molding apparatus is in the closed position, forming a parting line 42 (FIG. 2) therebetween.

The moveable mold half 30 reciprocates generally along a horizontal axis relative to the first or fixed mold half 20 by action of a clamping mechanism 70 with a clamp actuator 72 such as through a hydraulic, mechanical, or electrical actuator as known in the art. The clamping pressure exerted by the clamping mechanism 70 should have an operating pressure in excess of the pressures generated or exerted by the first composition injector and the second composition injector. The pressure exerted by the clamping mechanism ranges generally from about 2,000 to about 15,000, desirably from about 4,000 to about 12,000, and preferably from about 6,000 to about 10,000 pounds per square inch (psi) of mold surface.

Figure 2:
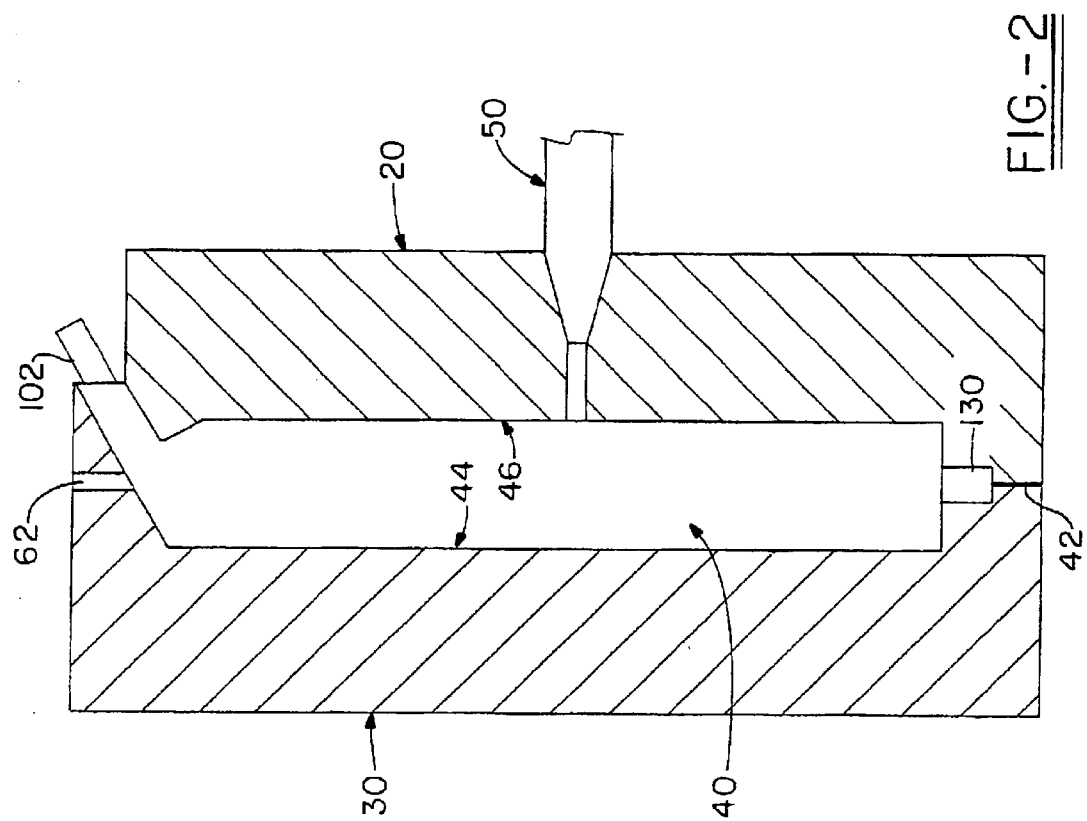
FIG. 2 is a cross section through a vertical elevation of a mold cavity.

In FIG. 2, the mold halves 20 and 30 are shown in a closed position, abutted or mated along parting line 42 illustrated at face surfaces 24 and 34 shown in FIG. 1. The mold cavity is illustrated in cross section. It is readily understood by those skilled in the art that the design of the cavity can vary greatly in size and shape according to the end product to be molded. The mold cavity generally has a first surface 44 on the first mold half, upon which a show surface of an article will be formed, and a corresponding back side or opposite second surface 46 on the second mold half. The mold cavity also contains separate orifices (47,62) to allow the first and second composition injectors to inject their respective compositions thereinto. The location of the injectors and injection orifices thereof can vary from apparatus to apparatus, and part to part, and can be based on factors such as efficiency, functionality, or desire of the mold designer.

As shown in FIG. 1, the first composition or substrate injector 50 is a typical injection molding apparatus which is well know to those of ordinary skill in the art and is capable of injecting a thermoplastic or thermosetting substrate composition, generally a resin or polymer, into the mold cavity. The first composition injector is shown in a "backed off" position, but it is readily understood that the same can be moved to a horizontal direction so that nozzle or resin outlet 58 mates with mold half 20 and can inject into mold cavity 40. For purposes of illustration only, the first composition injector in FIG. 1 is a reciprocating-screw machine wherein a first composition can be placed in hopper 52 and rotating screw 56 moves the composition through the heated extruder barrel 54, wherein the material is heated above its melting point. As the substrate material collects in the end of the barrel, the screw acts as an injection ram and forces it through the nozzle 58 into the mold cavity 40. The nozzle generally has a non-return valve at the nozzle or screw tip to prevent the backflow of material into the screw.

The first composition injector can be any apparatus capable of injecting a thermoplastic composition into the mold cavity. Suitable injection molding machines are well known in the art and are commercially available from Cincinnati Milacron, Battenfeld, Engel, Husky, Boy and others.

The method of in-mold coating of an injection molded part will now be described with reference to a typical injection molding/coating cycle. In a first step, the mold halves (20, 30) are closed and a mold cavity 40 is formed, as shown in FIG. 2. Thereafter, a clamping pressure is applied to the mold to counteract the injection pressure of the substrate composition molding material as well as the in-mold coating. The substrate composition in a melted or softened state is injected into the mold cavity from the substrate injection apparatus. After injection, the substrate composition in the mold cavity begins to "skin over" or become solidified, at least to an extent the substrate can withstand an injection pressure and/or flow pressure from the in-mold coating. During the solidification of the substrate, cooling takes place, which is believed to cause at least a slight shrinkage in the molded substrate in the mold cavity. The shrinkage or spacing within the mold cavity may or may not be visually noticeable to the naked eye.

After the substrate composition has been injected into the mold cavity and has achieved a suitable modulus, the in-mold coating can be injected as known in the art. A predetermined amount of in-mold coating is utilized to coat the molded substrate as desired. The following description of such a system is provided herein to facilitate a better understanding of the present invention. The in-mold coating apparatus 60 comprises an in-mold coating injector having a shut off pin which supplies a metered amount of a coating material. A supply pump is generally utilized to supply the in-mold coating material into a metering cylinder from a storage vessel or the like. The in-mold coating is injected from the metering cylinder into the mold cavity through passageway 62 with a pressurizing device utilizing as hydraulic, mechanical, or other pressure. When the in-mold coating apparatus is activated during injection mode, the coating material flows through passageway 62 and into the mold cavity between inner wall 44 of mold half 20 and a surface of the molded substrate. Once a predetermined amount of in-mold coating has been injected into the mold cavity, the in-mold coating apparatus 60 is deactivated thus causing the flow of coating to cease. The in-mold coating subsequently cures in the mold cavity and adheres to the substrate surface to which the same was applied. The curing can be caused by the residual heat of the substrate or mold halves, and/or by reaction between the components of the in-mold coating. The in-mold coating is injected into the mold cavity at a pressure ranging generally from about 500 to about 5000 psi, desirably from about 1500 to about 4500 psi, and preferably from about 2000 to about 4000 psi.

The in-mold primer coating of this invention is similarly useful for compression molding of thermoplastic substrates. Thermoplastic molding materials for compression molding can be compounded in a manner similar to injection molding thermoplastic molding materials, typically supplied in the form of coarse granules often referred to as molding powder, which ordinarily comprises thermoplastic resin, a filler or fillers, along with minor amounts of additives such as dye, colorant, and lubricants. Thermoplastic molding powders can be placed in a mold cavity and, on the application of heat and pressure, the thermoplastic resin melts and the compounding material flows to conform to the shape of the mold cavity and forma into a molded part. The mold and molded part are then cooled to solidify and harden the molded part. In-mold primer coatings can be injected into the compression mold to form an in-mold cured thermoset surface coating on the molded part in a manner similar to injection molding in-mold coating, whereupon the surface coated molded part can be removed from the mold.

The following examples further illustrate the merits and advantages of this invention, but are not intended to limit the scope of the invention.

EXAMPLE 1

In-Mold Primer Coating was produced from the following materials (Stylecoat 9000 XZ36)

| Ingredient | Parts | Wt. % | Function |
|---|---|---|---|
| HPMA | 55.00 | 16.74 | Monomer |
| Zinc Stearate | 5.00 | 1.70 | Mold Release |
| BPA Epoxy Acrylate | 100.00 | 34.08 | Crosslinking Oligomer |
| Styrene | 49.20 | 16.77 | Monomer |
| Polyvinyl Acetate | 7.80 | 2.66 | "Low Profile Additive" |

-continued

| Ingredient | Parts | Wt. % | Function |
|---|---|---|---|
| 12% Cobalt Napthenate | 0.30 | 0.10 | Accelerator |
| DisperseAyd 8 Black | 1.00 | 0.34 | Dispersant for Carbon |
| XC72R Carbon Black | 6.00 | 2.04 | Conductive Carbon Black |
| Benzoquinone | 0.05 | 0.02 | Inhibitor |
| Talc | 60.00 | 20.45 | Filler |
| Methacrylic Acid | 9.10 | 3.10 | Monomer |
| T-Butyl Peroxy Benzoate | 4.40 | 1.50 | Initiator |
| TOTAL | 293.45 | 100.00 | |

NOTES:
HPMA is Hydroxypropyl Methacrylate
BPA Epoxy Acrylate has a number average molecular weight of 1,500.

In-mold primer coatings were tested as follows:

Experimental panels were molded from GE Xenoy® GTX902 Polycarbonate/Nylon alloy using a Toshiba 950T injection molding machine and a 5"×20"×0.10" flat panel tool equipped with an in-mold coating injector. The coated portion of the part was 5"×20". Tool temperature was 200° F. Clamp tonnage was set at 500T. The in-mold coating was injected at 45 seconds after mold fill commenced with the thermoplastic resin (35 seconds after hold pressure began) on the molded part. The total cycle time comprised of part molding. In-mold coating injection and cure was 300 seconds.

Test results on applied in-mold primer coating are in Table 1.

TABLE 1

Primer Coating - Examples on GTX902 PC/Nylon Alloy

| EX. | COAT-ING | TAPE ADHESION GM9071P % RETENTION | | | CROSS-HATCH FORD B110601 GRADE | | | BRITTLENESS GM9506P GRADE | | | CHIP RESISTANCE, 0° F. GM8508P GRADE | | |
|---|---|---|---|---|---|---|---|---|---|---|---|---|---|
| | | INITIAL | POST-WATER | POST-HEAT | INITIAL | POST-WATER | POST-HEAT | INITIAL | POST-WATER | POST-HEAT | INITIAL | POST-WATER | POST-HEAT |
| A | Control | 0 | 0 | 0 | 10 | 10 | 10 | Fail | Fail | Fail | 1 | 1 | 1 |
| B | Example | 99 | 100 | 100 | 1 | 1 | 1 | Pass | Pass | Pass | 9 | 9 | 9 |

Control = In-mold coating of Example 1 without methacrylic acid.
Post-Water = Ford ESB-MZP124-A1; 10 Day Soak at 32° C.
Post Heat = GM 4385M; 7 Days at 70° C.
For Tape Adhesion, Pass = 95 to 100% retention on part
For Cross-Hatch, Pass = Grade 2, 1 or 0
For Chip Resistance, Pass = Grade 7, 8, 9 or 10

While in accordance with the Patent Statutes, the best mode and preferred embodiments have been set forth, the scope of the invention is not limited thereto, but rather by the scope of the attached claims.

What is claimed is:

1. An in-mold primer coating for in-mold coating a molded thermoplastic substrate, the in-mold primer coating comprising;
   a coreactive polymerizable composition including:
   100 parts by weight of an epoxy-acrylate oligomer having a number average-molecular weight from about 360 to about 2500;

from about 30 to about 70 parts by weight of an hydroxyl alkyl acrylate or methacrylate;

from about 30 to about 80 parts by weight of a vinyl aromatic monomer; and from about 2 to about 20 parts by weight of an acrylic acid monomer, and, wherein said parts by weight are based upon 100 parts by weight of said epoxy-acrylate oligomer.

2. The in-mold primer coating composition of claim 1, wherein the epoxy-acrylate oligomer is derived from bisphenol-A.

3. The in-mold primer coating composition of claim 2, wherein the epoxy-acrylate oligomer comprises a diacrylate terminated with acrylate groups.

4. The in-mold primer coating composition of claim 2, wherein the epoxy-acrylate oligomer comprises a dimethacrylate terminated with methacrylate groups.

5. The in-mold primer coating composition of claim 1, wherein the amount of the hydroxyl alkyl acrylate or methacrylate is present in an amount from about 40 to about 60 parts by weight.

6. The in-mold primer coating composition of claim 2, wherein the hydroxyl alkyl acrylate or methacrylate comprises an hydroxyl alkyl acrylate.

7. The in-mold primer coating composition of claim 2, wherein the hydroxyl alkyl acrylate or methacrylate comprises an hydroxyl alkyl methacrylate.

8. The in-mold primer coating composition of claim 1, wherein the vinyl aromatic monomer is present in an amount from about 40 to about 70 parts by weight.

9. The in-mold primer coating composition of claim 8, wherein the vinyl aromatic monomer comprises styrene.

10. The in-mold primer coating of claim 1, wherein the acrylic acid monomer is present in an amount from about 5 to about 15 parts by weight.

11. The in-mold primer coating of claim 1, wherein the acrylic acid monomer comprises acrylic acid.

12. The in-mold primer coating of claim 1, wherein the acrylic acid monomer comprises methacrylic acid.

13. The in-mold primer coating of claim 1, wherein said epoxy-acrylate oligomer is derived from bisphenol-A and from acrylic acid, wherein said hydroxy alkylacrylate or hydroxy methacrylate is hydroxypropyl methacrylate in an amount of from about 40 to about 60 parts by weight, wherein said vinyl aromatic monomer is styrene in an amount of from about 40 to about 70 parts by weight, and wherein said acrylic acid monomer is methacrylic acid in an amount of from about 5 to about 15 parts by weight.

14. The in-mold primer coating of claim 1, in combination with a polycarbonate and/or nylon based thermoplastic substrate.

15. The in-mold primer coating of claim 14, wherein the substrate comprises polycarbonate or a polycarbonate alloy thermoplastic.

16. A laminate, comprising:
an in-mold primer coating on a thermoplastic substrate, wherein said primer coating comprises the composition of claim 13, and wherein the substrate comprises a polycarbonate, or a nylon, or a blend thereof.

17. A laminate according to claim 16, wherein the substrate comprises a blend of the polycarbonate and a thermoplastic.

18. A laminate according to claim 16, wherein said primer coating is cured on said thermoplastic substrate.

19. A laminate according to claim 17, wherein said primer coating is cured on said thermoplastic substrate.

20. An in-mold coating for in-mold coating a molded thermoplastic substrate, the in-mold coating comprising by weight a coreactive polymerizable composition of:

from about 25% to about 65% of a low molecular weight epoxy-acrylate oligomer having a number average molecular weight from about 360 to about 2500;

from about 15% to about 40% of an hydroxy alkyl acrylate and/or methacrylate;

from about 10% to about 35% of a vinyl aromatic monomer; and from about 1% to about 10% of an acrylic acid monomer selected from acrylic acid and/or methacrylic acid.

21. The in-mold coating of claim 20, wherein the epoxy-acrylate oligomer comprises a diacrylate terminated with acrylic groups.

22. The in-mold coating of claim 20, wherein the epoxy-acrylate oligomer comprises a dimethacrylate terminated with methacrylic groups.

23. The in-mold coating of claim 20, wherein the epoxy-acrylate oligomer comprises one or more epoxy-diacrylate and/or epoxy-dimethacrylate oligomers.

24. The in-mold coating of claim 21, wherein the vinyl aromatic monomer comprises styrene.

25. The in-mold coating of claim 24, wherein said hydroxy alkylacrylate is hydroxypropyl methacrylate, and wherein the acrylic acid monomer comprises methacrylic acid.

26. A molded thermoplastic laminate, comprising:
a thermoplastic substrate coated with a cured in-mold primer coating, said primer coating comprising:
about 100 parts by weight of a low molecular weight epoxy acrylate having a number average molecular weight from about 360 to about 2500;
from about 30 to about 70 parts by weight of an hydroxyl acrylate or methacrylate;
from about 30 to about 80 parts by weight of a vinyl aromatic monomer; and
from about 2 to about 20 parts by weight of acrylic acid or methacrylic acid,
said parts by weight are based upon 100 parts by weight of said epoxy-acrylate oligomer.

27. The laminate of claim 26, wherein the substrate is an injection molded polycarbonate or a polycarbonate thermoplastic blend.

28. The laminate of claim 27, wherein said epoxy-acrylate oligomer is derived from bisphenol-A and from acrylic acid, wherein said hydroxy alkylacrylate or methacrylate is hydroxypropyl methacrylate in an amount of from about 40 to about 60 parts by weight, wherein said vinyl aromatic monomer is styrene in an amount of from about 40 to about 70 parts by weight, and wherein said acrylic acid monomer is methacrylic acid in an amount of from about 5 to about 15 parts by weight.

29. The laminate of claim 26, wherein the substrate is a compression molded polycarbonate or polycarbonate plastic alloy.

30. An in-mold coating process, comprising the steps of:
injection molding a thermoplastic substrate,
applying a primer coating on said thermoplastic substrate, said primer coating comprising:
about 100 weight parts of an epoxy-acrylate oligomer having a molecular weight from about 360 to about 2500;
from about 30 to about 70 weight parts of an hydroxyl alkyl acrylate or methacrylate;
from about 30 to about 80 weight parts of a vinyl aromatic monomer;
from about 2 to about 20 weight parts of acrylic acid or methacrylic acid;

wherein said parts by weight are based upon 100 parts by weight of said epoxy-acrylate oligomer; and polymerizing the in-mold coating to form a thermoset primer coated thermoplastic substrate.

31. The process of claim 30, including curing said primer coating and wherein the aromatic vinyl monomer comprises styrene, wherein said hydroxy alkyl methacrylate comprises hydroxypropyl methacrylate.

32. The process of claim 30, wherein the molded thermoplastic substrate is a polycarbonate or a polycarbonate thermoplastic blend.

33. The process of claim 31, wherein the molded thermoplastic substrate is a polycarbonate or a polycarbonate thermoplastic blend.

* * * * *